3,402,129
SOLID ADDITION COMPOUNDS FOR PRODUCING SMOKE AND PROCESS FOR FORMING SAID COMPOUNDS

Alfred F. Tatyrek, Maplewood, N.J., assignor to the United States of America as represented by the Secretary of the Army
No Drawing. Filed June 3, 1966, Ser. No. 555,932
7 Claims. (Cl. 252—305)

ABSTRACT OF THE DISCLOSURE

Processes for converting smoke-producing liquids such as titanium tetrachloride or vanadium oxytrichloride into solids by causing about 35 to 65 volume percent of the liquid smoke-producing compound to react with about 65 to 35 volume percent of fuming sulfuric acid having a concentration of about 40 to 80 percent, the reaction being brought about by stirring the chloride with the acid for a few seconds.

---

This invention relates to pyrotechnics and more particularly concerns methods of converting smoke producing liquids into more useable and highly desirable solid compounds.

Titanium tetrachloride and vanadium oxytrichloride are well known highly reactive hydrolyzable metal chloride compounds finding utility as liquid smoke producing agents. Titanium tetrachloride ($TiCl_4$) has been used to produce white smoke clouds. It evaporates and undergoes hydrolysis with the moisture of the air, for example, to produce voluminous and dense white smoke consisting of hydrated titanium dioxide and hydrogen chloride fumes. Since this noncombustion type reaction proceeds rapidly under very nearly all conditions of temperature and humidity found on the earth's surface to liberate extensive quantities of smoke, and requires no initiation, it would be most advantageous if liquid $TiCl_4$ could be readily converted to the more useable and desirable solid form.

Similarly, liquid vanadium oxytrichloride ($VOCl_3$) produces an intense orange color smoke. The liquid forms, however, of both aforementioned smoke producing compounds suffer many disadvantages, due to high vapor pressures thereof providing:
(a) Undesirably rapid rate of vaporization
(b) Excessive leakage in their packaging
(c) Handling difficulties
(d) Aerodynamic heating during ballistic flight of a rocket or projectile containing these liquids and causing variations in liquid vapor pressure.

Further, the aforementioned disadvantages are not completely overcome when thickening agents such as silica gel or adsorbers, such as nylon or glass fibers are added to the liquid compounds. In addition, the solid component of these physical mixtures is inert insofar as production of smoke is concerned.

It is therefore a broad object of the invention to provide smoke producing compounds suffering none of, or a least substantially eliminating, the disadvantages aforementioned.

Another object of the invention is to provide methods of converting various liquid smoke producing compounds into solid compounds.

Still another object of the invention is to provide methods for converting various liquid smoke producing compounds into solids employing readily available chemicals, said methods being inexpensive, rapid and efficient.

Other objects and advantages of the invention will be apparent as the description of the invention proceeds.

In accordance with the above objects, I have discovered that certain highly reactive liquid hydrolyzable metal chloride compounds, when reacted with fuming sulfuric acid will produce a hard and gummy sulfur trioxide addition compound possessing all the smoke producing qualities of the original liquid metal chloride compound.

More specifically, when $TiCl_4$ and $VOCl_3$ are caused to react with fuming sulfuric acid, solid $TiCl_4 \cdot SO_3$ and $VOCl_3 \cdot nSO_3$ are readily and economically produced.

Although it is not intended that the invention be limited thereto, there is set forth hereinbelow, for purpose of illustration, examples of procedures which may be used in practicing my invention.

Example I

At room temperature under a hood, 10 cc. of $TiCl_4$ was placed into a 300 cc. glass beaker and 10 cc. of 65% fuming sulfuric acid ($H_2SO_4 \cdot SO_3$) slowly poured therein, the contents being carefully stirred as long as possible before a product is formed. Within, however, a period of about four seconds, a slurry formed and in less than nine seconds, a final product weighing about 36½ grams and having a structure resembling frozen butter formed.

The reaction may be characterized as follows:

$$TiCl_4 \xrightarrow{H_2SO_4 \cdot SO_3} TiCl_4 \cdot SO_3$$

$TiCl_4 \cdot SO_3$ is a solid compound and will contain $H_2SO_4$ therewithin. The preferred fuming sulfuric acid ($H_2SO_4 \cdot SO_3$) concentration is about 65%, i.e., 35% actual $H_2SO_4$ and 65% free $SO_3$. The effective concentration of fuming sulfuric acid may vary between about 40 to 80%, although about 60 to 70% has been found more effective. Concentrations below about 40% will not form solid addition compounds of either $TiCl_4$ or $VOCl_3$. The reaction above is probably one of addition of the $SO_3$ to $TiCl_4$ with the sulfuric acid acting as a carrier for $SO_3$. Liquid carriers for the $SO_3$ other than sulfuric acid have been successfully used. However, the processes described in this invention have been found most desirable. Of course, when the fuming sulfuric acid concentration is raised to about 70%, the free $SO_3$ is increased and accordingly lesser quantities of the acid will be necessary to produce the desired reaction. The reaction will also be slightly accelerated.

When the final solid product reacts with moisture, large quantities of white smoke are evolved in accordance with the following equation:

$$TiCl_4 \cdot SO_3 + 5H_2O \rightarrow Ti(OH)_4 + 4HCl + H_2SO_4$$

Example II

At room temperature under a hood, 12 cc. of $VOCl_3$ was placed into a 300 cc. glass beaker and 8 cc. of 70% fuming sulfuric acid carefully poured therein while the contents were constantly stirred. In about 3½ seconds, a thick slurry was formed and an additional 2½ seconds produced a hard and gummy solid. The reaction may be characterized:

$$VOCl_3 \xrightarrow{H_2SO_4 \cdot SO_3} VOCl_3 \cdot n(SO_3)$$

The value of ($n$) is not known. The final addition product, however, is a solid. When the solid reacts with water an orange smoke is produced:

$$2VOCl_3 \cdot SO_3 + 5H_2O \rightarrow V_2O_5(\text{hydrated}) + 6HCl + 2H_2SO_4$$

When the fuming sulfuric acid concentration resides between about 40 to 80%, the effective range of $TiCl_4$ and $VOCl_3$ will vary between about 35 to 55 volume percent when 65% fuming sulfuric acid is used; approximately equal volumes of either $TiCl_4$ or $VOCl_3$ will yield the respective solid addition product having optimum smoke producing and handling properties.

The final product may readily be pressed into desired hardware items under conditions of very low humidity. If necessary, my solid products may even be machined, and if the $H_2SO_4$ contained therewithin is removed, may even be pulverized into granular pellets or powder.

I claim:

1. A process for forming a sulfur trioxide addition compound of a highly reactive liquid hydrolyzable metal chloride selected from the group consisting of $TiCl_4$ and $VOCl_3$ comprising reacting about 35 to 65 volume percent of said chloride with about 65 to 35 volume percent of fuming sulfuric acid having a concentration ranging between about 40 to 80%.

2. The process as described in claim 1 wherein said chloride consists of $TiCl_4$, said volume percents are 50 percent each for said chloride and said acid concentration is about 65%.

3. The process as described in claim 2 wherein said $TiCl_4$ and acid is stirred for about three seconds to form a slurry, and stirred for about an additional four seconds to produce a solid compound.

4. The process as described in claim 1 wherein said chloride consists of $VOCl_3$, said volume percents are 60 percent and 40 percent by liquid $VOCl_3$ for said chloride and said acid, respectively, and said acid has a concentration of about 70%.

5. The process as described in claim 4 wherein said $VOCl_3$ and acid are stirred for about 3½ seconds to form a thick slurry, and stirred for about an additional 2½ seconds to produce a solid compound.

6. The solid smoke-producing compound $TiCl_4 \cdot SO_3$.

7. The solid smoke-producing compound $$VOCl_3 \cdot n(SO_3)$$

where $n$ is at least 1.

References Cited

UNITED STATES PATENTS 2,175,790   10/1939   Booker et al. _____ 252—305

LEON D. ROSDOL, *Primary Examiner.*

R. D. LOVERING, *Assistant Examiner.*